United States Patent [19]

Frania

[11] Patent Number: 5,263,556
[45] Date of Patent: Nov. 23, 1993

[54] BRAKE ACTUATING DEVICE WITH AN ADJUSTMENT DEVICE FOR A VEHICLE BRAKE

[75] Inventor: Josef Frania, Hanover, Fed. Rep. of Germany

[73] Assignee: WABCO Westinghouse Fahrzeugbremsen GmbH, Hanover, Fed. Rep. of Germany

[21] Appl. No.: 710,774

[22] Filed: Jun. 5, 1991

[30] Foreign Application Priority Data

Jun. 5, 1990 [DE] Fed. Rep. of Germany ....... 4017952

[51] Int. Cl.$^5$ ............................................. F16D 63/00
[52] U.S. Cl. ............................ 188/79.55; 188/196 D
[58] Field of Search ........... 188/79.51, 79.55, 196 BA, 188/196 D, 1.11, 196 D; 192/111 A

[56] References Cited

U.S. PATENT DOCUMENTS

| | | |
|---|---|---|
| 2,379,796 | 7/1945 | Freeman et al. ............. 188/196 BA |
| 3,997,035 | 12/1976 | Zeilder ..................... 188/196 BA X |
| 4,620,618 | 10/1986 | Monick ........................ 188/196 BA |

FOREIGN PATENT DOCUMENTS 271236 8/1968 Austria .
1455913 2/1970 Fed. Rep. of Germany .
1480038 11/1970 Fed. Rep. of Germany .
2248927 4/1974 Fed. Rep. of Germany .
3343885 10/1984 Fed. Rep. of Germany .
3625107 9/1987 Fed. Rep. of Germany .
3836080 4/1990 Fed. Rep. of Germany .

Primary Examiner—Robert J. Oberleitner
Assistant Examiner—Lee W. Young
Attorney, Agent, or Firm—Horst M. Kasper

[57] ABSTRACT

A brake actuating device is furnished with a device for slack readjustment of a brake, in particular of a vehicle brake. Defects in the area of the readjustment device can result in an erroneous and defective brake behavior. The invention device furnishes a continuous control of the brake release gap and the brake lining wear. The motion of the slack readjustment device (5, 7) is used for generating a measurement distance (n) which is scanned by a signal generator (27, 31) for feeding a signal to an evaluation device and for indicating the readjustment situation. The evaluation device serves for a continuous surveillance and monitoring of the brake release gap and of the brake lining wear in a vehicle or in a diagnostic center, where the evaluation device can be connected to the vehicle.

17 Claims, 4 Drawing Sheets

BRAKE ACTUATING DEVICE WITH AN ADJUSTMENT DEVICE FOR A VEHICLE BRAKE

BACKGROUND OF THE INVENTION

1. Field of the Invention

The invention relates to a brake operating device with a means for readjusting a brake, in particular a vehicle brake, where a brake lever is furnished, which brake lever performs together with a brake shaft a pivoting motion around a rotation axis of the brake shaft, which pivoting motion results in an actuation of a brake in the sense of an overcoming of a brake release gap for the purpose of engaging of a brake lining at two brake drums. 2. Brief Description of the Background of the Invention Including Prior Art A device of the kind recited above is known from the German Patent DE-PS 1,480,038. The known device includes a slack readjustment device, which allows to adjust the position of parts of a brake actuator relative to each other, namely adjusting the position of a brake linkage rod and of a brake lever disposed on the brake shaft. The adjustment serves to provide a continuous readjustment of the position of the parts of the brake actuator in the sense of a maintaining of a preset brake release gap. This readjustment is performed to assure a uniform response behavior of the brakes or, respectively, a uniform brake behavior which, last but not least, is subject matter of corresponding legal and/or regulatory requirements regarding driving safety.

Wear of defects of the slack readjustment device and of its actuating mechanism can, however, effect a deficient readjustment with the consequence that the brake release gap, predefined by the brake type, can no longer be maintained in the course of the driving operation and then does no longer correspond to the actual brake lining wear. A defective readjustment or a complete lack of a readjustment is recognizable in the recited device only by a changing brake actuating stroke, by a decrease in the braking effect, or by a failing of the braking effect. However, this undesired change of the brake release gap occurs only gradually and usually over a longer period of time and is therefore initially hardly perceivable. Therefore, there exists a need to give the operator the certainty with regard to the actual state of the brake release gap and/or of the wear of the brake lining for safety reasons.

An inductive path generator is taught in the German Printed Patent Publication DE-OS 3,813,691 A1 to Rainer Nowak, where a first measurement coil exhibiting measurement inductivity is employed and where a second or redundant measurement coil is furnished for obtaining redundancy, which coils capture the measurement path of a measurement cone.

A device for the display of the brake lining wear of heavy road vehicles such as, for example, trucks, buses, pulling machines or the like is taught in the German Printed Patent Publication DE-OS 2,248,927 to Helmut Hase. The reference teaches to employ a switch 19, actuated by contact pin 15, which is connected to display member.

A brake cylinder is taught in the German Printed Patent Publication DE-OS 3,836,080 A1 to Josef Frania. An inclined plane is disposed at an axially shiftable radially guided part of a piston, and the contact pin of an electrical path sensor engages the inclined face. An automatic readjustment device for the spread cam of a drum is taught in the German Patent DE 3,625,107 Cl to Georg Sulzyc et al. The coupling exhibits a coupling ring which is rotatably disposed on a worm shaft. A brake device acts on the worm shaft, where the brake device is formed of a second coupling formed as a free wheel and which allows free motion in an opposite rotary sense relative to the first coupling 5,6,7,8.

The German Printed Patent Document DE-OS 1,455,913 to Leo Goldman et al. teaches a device for the display of the wear of brake linings. The reference teaches a rotary mounted cam shaft, which carries a cam disposed between spreadable brake shoes. The brake shoes are furnished with brake linings. The brake linings can come to a rest position at a drum. An adjustment lever, adjustable in a rotary manner, is connected to the cam shaft.

The Austrian Patent 271,236 teaches a display device for an automatically adjusting of a brake lever. An electrical contact arrangement is furnished at a brake lever 1 and at a brake cam shaft for a current circuit containing a display device such that as soon as the brake lever is adjusted versus the brake cam shaft by a rotary angle corresponding to a maximum permissible wear of the brake linings then the contact arrangement of the indicator apparatus is turned on.

The U.S. Pat. No. 2,379,796 to Leon T. Freeman et al. teaches a brake operating mechanism. A pointer 46 is secured on a shaft by a locknut 41 where the pointer cooperates with a scale 48 on the outer end plate 25 of the casing to indicate the adjusted position of the cam. It appears that this scale is used to indicate the wear of a brake lining.

SUMMARY OF THE INVENTION

1. Purposes of the Invention

It is an object of the present invention to furnish a brake operating device of the initially recited kind and to improve such device with simple means for continuously scanning and capturing an actuating stroke of the brake actuator, corresponding to the brake release gap and for compensating a wear of the brake lining.

It is another object of the present invention to provide a means within the framework of a standard brake actuator for transducing signals corresponding to the wear of the brake lining.

These and other objects and advantages of the present invention will become evident from the description which follows.

2. Brief Description of the Invention

According to the present invention, there is provided for a brake actuating device with a means for slack readjustment of a brake, in particular of a vehicle brake. A brake lever performs together with the brake shaft a pivoting motion around a rotation axis of the brake shaft. The pivoting motion serves for actuation of a brake in the sense of overcoming a brake release gap for the purpose of bringing a brake lining closer to a brake drum. A slack readjustment device is connected to and disposed between the brake lever and the brake shaft, and includes a worm. The brake shaft is adjustable relative to the brake lever around the rotation axis of the brake shaft by means of the slack readjustment device, in the sense of a maintaining of the brake release gap upon wear of the brake lining. A worm wheel is disposed fixed against rotation on the brake shaft. The worm is engaged with the worm wheel in a kind of a coupling structure. A distance sensor captures a position of the slack readjustment device and serves for scanning a measurement distance n generated with the slack readjustment device. A signal generator is connected to the distance sensor. The signal generator generates a signal depending on the scanned and contacted measurement distance n.

A device component can be furnished for generation of the measurement distance n. The component can be adjusted with the worm coordinated and associated to the slack readjustment device. The device component can be disposed longitudinally shiftable relative to the worm. The measurement distance n can be generated depending on the adjustment motion of the worm.

The worm can be disposed in the brake lever and can include an extension. The extension can form one piece with the worm or, respectively, can be connected, fixed against rotation, to the worm. The extension can extend outside of the brake lever. A transfer mechanism can be connected to and disposed between the extension and the device component. The transfer mechanism can serve for transmitting an adjustment motion of the worm to the device component.

The slack readjustment device can include a control cam disposed inclined relative to a shifting axis of the device component. The distance sensor, connected to the signal generator, can be formed as a contact pin. The contact pin can be engaged with the control cam.

The transfer mechanism can be formed by an inner thread of the device component. The inner thread can be engaged with an outer thread fixed against rotation to the extension.

The outer thread, coordinated to the extension, can be disposed on a bush. The extension can be surrounded by the bush and connected, fixed against rotation, to the bush.

A locking mechanism can be disposed and acting between the bush and the extension. The bush and the extension can be brought by the locking mechanism into a desired locking and engagement position.

The slack readjustment device can be furnished with a magnet-field-active means. The motion of the magnet-field-active means relative to the signal generator can be registered as a measurement distance n with the distance sensor formed as a magnet field sensor. The magnet-field-active means can be disposed at the extension of the worm. Alternatively, the magnet-field-active means can be disposed at a device component, connected fixed against rotation to the slack readjustment device.

A method for operating a brake device with a means for slack readjustment of a brake comprises the following steps. A brake lever pivots together with a brake shaft around a rotation axis of the brake shaft. A brake is actuated in a directional sense of overcoming a brake release gap with the pivoting motion for the purpose of bringing a brake lining closer to a brake drum. The brake shaft is adjusted relative to the brake lever around the rotation axis of the brake shaft by means of the slack readjustment device in the sense of a maintaining of the brake release gap upon wear of the brake lining. The slack readjustment device is connected to and disposed between the brake lever and the brake shaft. The slack readjustment device includes a worm. The worm engages with a worm wheel in a kind of a coupling structure. The worm wheel is disposed fixed against rotation on the brake shaft. A position of the slack readjustment device is measured with a distance sensor. A measurement distance n, generated with the slack readjustment device, is scanned with a signal generator connected to the distance sensor. A signal is generated with the signal generator depending on the scanned measurement distance n.

The present invention can be economically performed by utilization of a control system based on commercially available distance sensors described, for example, in the German Printed Patent Document DE-OS 3,343,885.

The invention provides the possibility to test and evaluate the condition or, respectively, the operating behavior of a brake device in an electronic diagnostic system. The electronic diagnostic system can be set up in a workshop or garage or which electronic diagnostic system can form part of the vehicle.

The invention can be performed with any suitable brake lever, independent of the particular kind of actuating mechanism acting on the brake lever. By way of example only, brake cylinders actuatable with compressed air or brake fluid are suitable for this purpose.

The present invention increases the operating safety of the brake system, which is advantageous in particular in vehicles. This holds in particular, where the slack readjustment device is disposed in the brake lever and where consequently a visual monitoring of a wear of brake elements is hardly possible.

An additional advantage of the invention comprises embodiments furnishing a connection of the monitoring device to function elements of the brake lever. Protection is thereby achieved against environmental influences prevailing at the vehicle.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENTS

Figure 1:
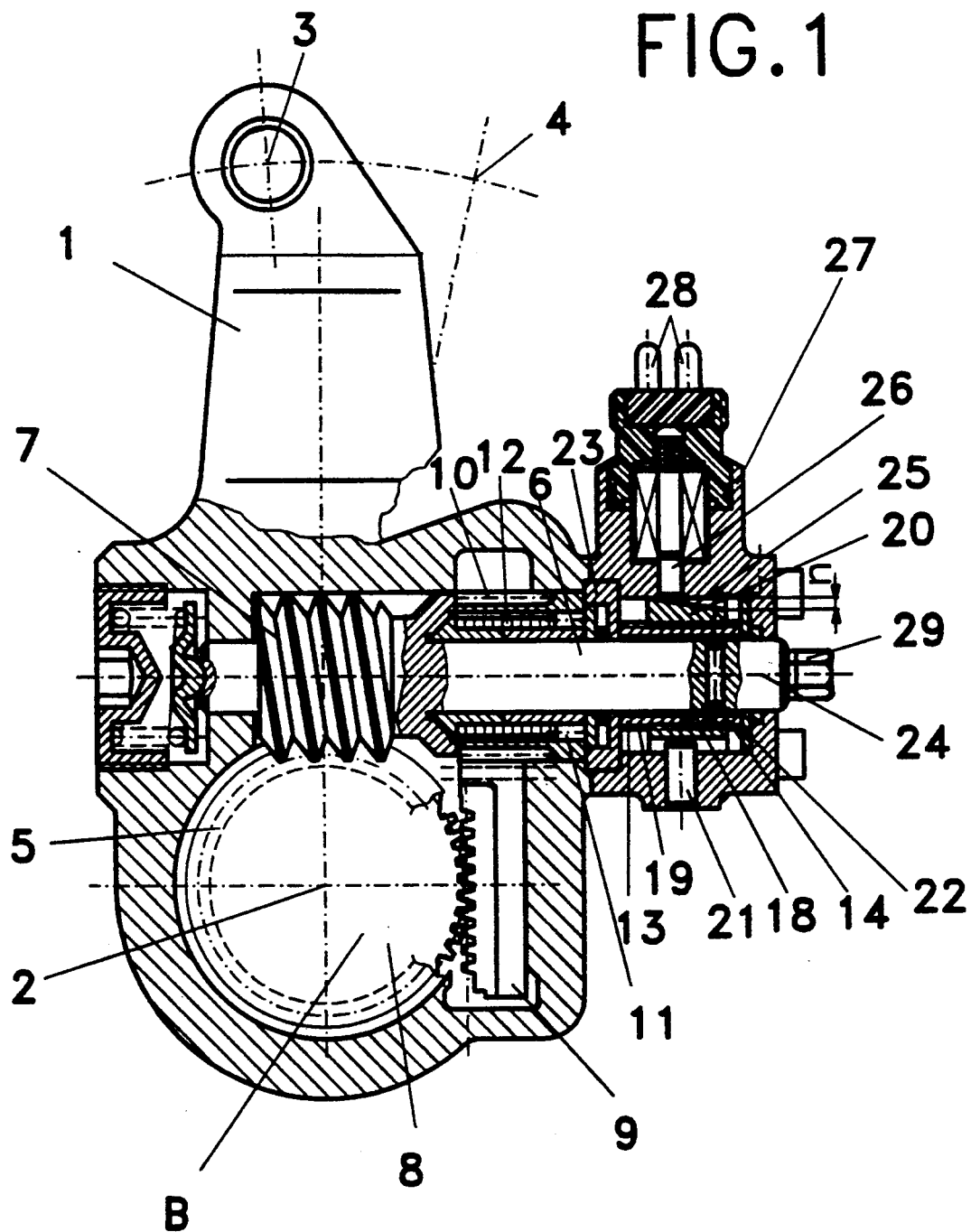
FIG. 1 is an in part sectional view of brake actuating device with a device for surveillance and monitoring of the brake lining wear.
Figure 2:
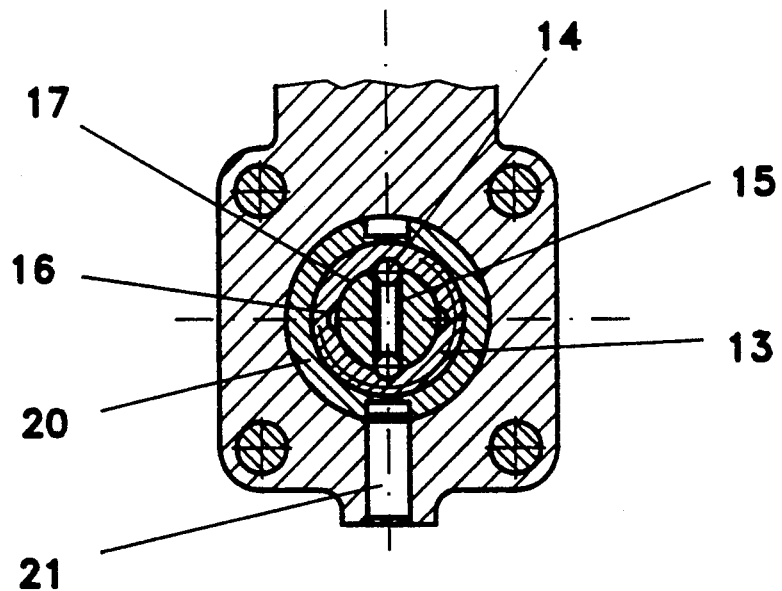
FIG. 2 is a detail view in section of the device according to FIG. 1.

The invention device is provided to monitor the functioning of the slack readjustment device for maintaining a substantially constant brake release gap as well as to monitor the brake lining wear.

A brake actuating device is furnished with a means for slack readjustment of a brake, in particular of a vehicle brake. A brake lever performs together with a brake shaft a pivoting motion around a rotation axis of the brake shaft. The pivoting motion serves for actuation of a brake in the sense of overcoming a brake release gap for the purpose of bringing a brake lining closer to a brake drum. A slack readjustment device is furnished between the brake lever and the brake shaft. The brake shaft is adjustable relative to the brake lever around the rotation axis of the brake shaft by means of the slack readjustment device, in the sense of a maintaining of the brake release gap upon wear of the brake lining. A worm wheel is disposed, fixed against rotation, on the brake shaft. A worm engaged with the worm wheel form the slack readjustment device in a kind of a coupling. The improvement according to the instant invention comprises that a signal generator 27, 31 with a distance sensor 26, 30 is furnished, which serves for scanning of a measurement distance n, generated with the slack readjustment device 5, 7. The signal generator 27, 31 generates a signal depending on the scanned and contacted measurement distance n.

A device component 20, 33 can be furnished for generation of the measurement distance n. The device component 20, 33 can be adjusted with the worm 7 coordinated and associated with the slack readjustment device 5, 7. The device component 20, 33 can be disposed longitudinally shiftable relative to the worm 7. The measurement distance n can be generated depending on the adjustment motion of the worm 7.

The worm 7 can be disposed in the brake lever 1 and can exhibit an extension 6, forming one piece with the worm 7 and connected fixedly to the worm 7, respectively. The extension 6 can extend outside of the brake lever 1. A transfer mechanism 18, 19 can be furnished between the extension 6 and the device component 20, 33. The transfer mechanism 18, 19 can serve for transmitting the adjustment motion of the worm 7 to the device component 20, 33.

The distance sensor 26 of the signal generator 27 can be formed as a contact pin 26. The contact pin 26 can be engaged with the control cam 25 disposed inclined relative the shifting axis 24 of the device component 20. The transfer mechanism 18, 19 can be formed by an inner thread 19 of the device component 20, 33. The the inner thread 19 can be engaged with an outer thread 18 fixed against rotation to the extension 6. The outer thread 18 coordinated to the extension 6 can be disposed on a bush 13. The extension 6 can be surrounded by the bush 13 and connected, fixed against rotation, to the bush 13. A locking mechanism 14 can be furnished and can act between the bush 13 and the extension 6. The bush 13 and the extension 6 can be brought by the locking mechanism 14 into an arbitrary locking and engagement position.

The slack readjustment device 5, 7 can be furnished with a magnet-field-active means 30. The motion of the magnet-field-active means 30 relative to the signal generator 31 can be registered as a measurement distance n with a distance sensor 32 formed as a magnet field sensor 32.

The magnet-field-active means 30 can be disposed at the extension 6 of the worm 7.

The magnet-field-active means 30 can be disposed at a device component, connected fixed against rotation to the slack readjustment device 5, 7.

The brake operating device includes according to FIG. 1 a brake lever 1, which is disposed on a brake operating shaft 2 as well as an operating member, connected to the brake lever 1 and not illustrated, such as for example a brake cylinder actuated by a pressure means. The brake lever 1 with the brake operating shaft 2 is pivotable around a rotation axis of the brake operating shaft 2 by means of the operating member. The brake lever turn angle, covered during the pivoting of the brake lever 1 between a predefined initial position 3 and a final position 4 corresponds to a closing of a release gap by the brake elements, such as for example between brake shoes and brake drum, until the brake shoes engage the brake drum during a brake actuation.

The slack readjustment device 5, 7 can be provided by a gear coupling including a worm wheel 5 and a worm 7 and disposed between the brake operating shaft 2 and the brake lever 1. In order to maintain a preset brake release gap independent of the wear of the brake elements including a brake lining and a brake drum, the brake actuating shaft 2 is adjustable versus and relative to the brake lever 1, corresponding to a wear of, for example, the lining of a brake drum. This readjustment effects that the maximum brake lever turn during a brake actuation remains nearly unchanged between an initial position 3 and a final position 4. A deviation therefrom in preset and predefined limits should finally only be given by a certain elasticity of the brake linkage and by a different temperature rise of the brake drum during brake actuation.

The slack readjustment device 5, 7, can be actuated by a drive 8, 9, 10. The drive 8, 9, 10 comprises a gear wheel 8 disposed rotatable around the brake operating shaft 2 and disposed rotatable relative to the brake lever 1, a gear rack 9, engaging the gear wheel 8, and a pinion 10, engaging the gear rack 9. A lost motion device, limited by stops 11, and a one-way coupling 12 of the kind of a free-wheel are disposed between the drive 8, 9, 10, and the slack readjustment device 5, 7.

The gear wheel 8 is connected to a reference point B, wherein the reference point is disposed such relative to the brake lever 1 that the gear rack 9 and the pinion 10 are placed in a drive motion relative to the slack readjustment device 5, 7, in case of a brake lever turn by a relative motion of the brake lever 1 with respect to the gear wheel 8. However, in case of a rotary motion of the pinion 10 within the stops 11 of the lost motion device, the drive motion is not transmitted via the one-way coupling 12 to the slack readjustment device 5, 7. The drive motion of the gear rack 9 and of the pinion 10, where the pinion 10 moves between the stops 11 of the lost motion device, corresponds to the brake lever turn between the initial position 3 and the final position 4, which brake lever turn is to correspond to a preset and predetermined brake release gap between the brake shoes and the brake drum.

In case of a defect or deficiency of the above-recited and described slack readjustment device, i.e. if the wear of the brake elements, caused by the driving operation, is not compensated by an adjustment of the brake operating shaft 2 relative to the brake lever 1, then a brake lever turn occurs during brake actuation which surpasses the final position 4.

FIG. 1 illustrates a brake actuating device with a brake lever 1 combined with a device for the monitoring of the functioning of the slack readjustment device 5, 7, such as is described, for example, in the German Printed Patent Publication DE-OS 3,343,885.

The worm 7 exhibits an extension 6 extending beyond the casing of the brake lever 1. A bush 13 surrounding the extension 6 is connected, to the extension 6 such that the bush is fixed against rotation. The connection, fixed against rotation, is performed via a locking mechanism 14 effective between the extension 6 and the bush 13. The locking mechanism is formed, for example, in the kind of a ball-type locking mechanism 14, pretensioned by way of a spring 15 by ratchets 16, where the ratchets are disposed in an arbitrary number along the inner diameter of the bush 13.

The bush 13 is furnished with an outer thread 18, which is in operating connection with an inner thread 19 of a device component 20 generating a measurement distance n. The thread connection 18, 19 operates as a transfer mechanism 18, 19. The device component 20 can be moved in longitudinal direction corresponding to the rotary motion of worm 7 in the sense of an adjustment motion of the slack readjustment device 5, 7 relative to the worm 7 by the transfer mechanism 19, 20. The device component 20 is secured against unintentional carrying along on the bush 13 by a pin 21, fixedly disposed at the casing. The bush 13 is secured at its two front faces by support bearings 22, 23 against an excessive longitudinal shifting relative to the extension 6. The device component 20 exhibits a cam 25 inclined relative to the rotation axis 24 of the device component 20. A distance sensor 26 of a signal generator 27, formed as a contact pin 26, is engaged with the control cam 25. Electrical signals can be generated by the signal generator 27 and can be fed via electrical contacts 28 to a display or, respectively, evaluation device.

The extension 6 exhibits at its free end a profiling 29, which serves for the application and engagement of a tool key. The slack readjustment device 5, 7, can be manually adjusted with said tool key. The locking mechanism 14 serves in the two adjustment directions as break safety, where the device component 20 has come to rest by adjustment in its end positions at the support bearings 22 or 23. The extension 6 performs a relative motion with respect to the bush 13 and the device component 20 by overcoming the locking mechanism 14.

The mode of operation of this device is as follows:

The brake lever 1 is brought into a starting position 3 by a manual adjustment of the slack readjustment device 5, 7. The control cam 25 is disposed at the beginning of the measurement distance n relative to the distance sensor 26 for a predefined brake release gap. The enlarged pivoting of the brake lever 1, occurring in the course of the driving operation as a result of the brake lining wear is used in the above recited manner for the adjustment of the slack readjustment device 5, 7. The adjustment of the slack readjustment device 5, 7 in turn effects a relative motion of the control cam 25 versus the distance sensor 26. The position of the distance sensor 26, set by the scanning and the contacting of the control cam 25, can be fed as an electrical signal via the contacts 28 to a display device or to an evaluation device, respectively, where the electrical signal can be measured and identified for indicating and identifying a measure of a brake lining wear.

Figure 3:
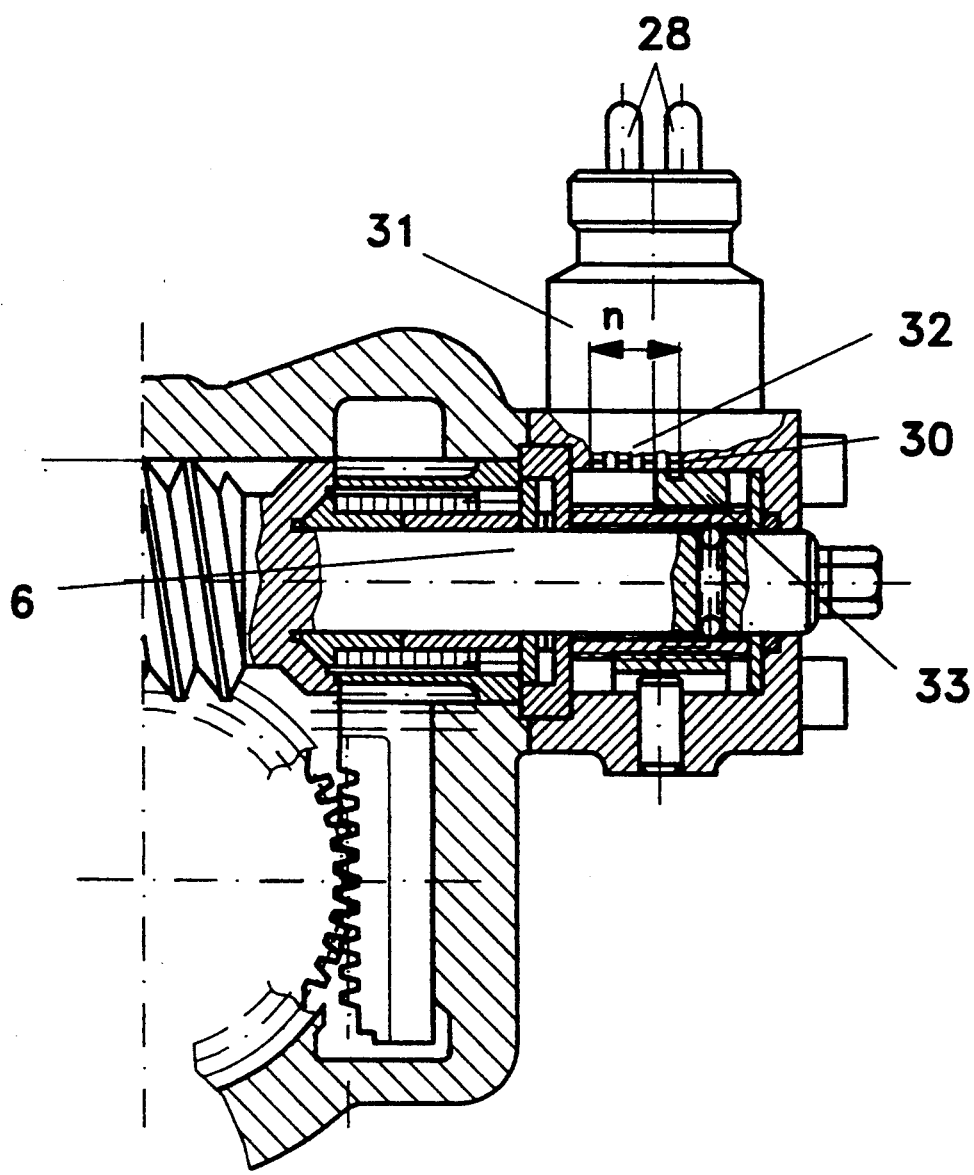
FIG. 3 is an in part sectional view of a detail of the embodiment according to FIG. 1 and FIG. 2.

As can be gathered from FIG. 3, the readjustment device 5, 7 or device components, movable with the readjustment device 5, 7 such as for example the extension 6, can be furnished with magnetic-field-generating means or magnetic-field-changing means, designated in the following as magnet-field-active means 30. The actuation of the magnetic field generating means or magnetic field changing means relative to a signal generator 31 can be generated as measurement distance n with a distance sensor 32 formed as a magnetic field sensor 32.

The electrical signals at the electrical connections 28 of signal generator 27, 31 can be advantageously be employed for the control of an optical or an acoustical display device in the driver cabin, or for a transmission feeding to an electrical evaluation device of a stationary diagnostic center, for example, in case of a vehicle inspection station.

Figure 4:
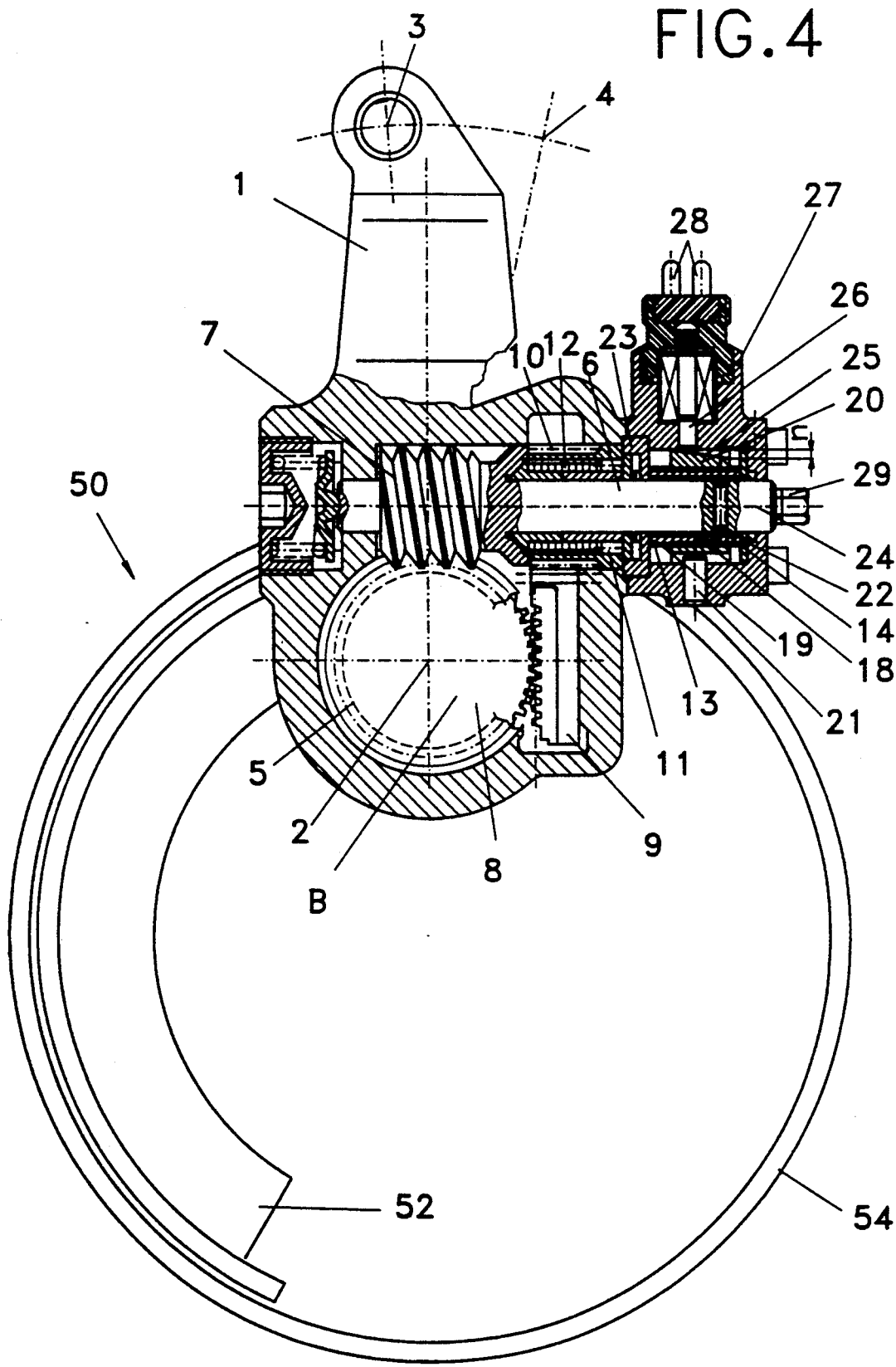
FIG. 4 is a sectional view of a vehicle brake, the brake lining, and the brake drum together with the brake actuating device of FIG. 1.

The disposition of the brake actuating device with the device for the adjustment of the brake 50 is shown in FIG. 4. The brake 50 includes the brake linings 52, where the brake linings 52 closely follows to the contour of the brake drum 54.

It will be understood that each of the elements described above, or two or more together, may also find a useful application in other types of brake-operating devices differing from the types described above.

While the invention has been illustrated and described as embodied in the context of a brake operating device with a means for adjusting of a brake, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A brake actuating device with a brake adjustment device for a vehicle brake, comprising:
    a brake shaft;
    a brake lever performing together with the brake shaft a pivoting motion around a rotation axis of the brake shaft, where the pivoting motion serves for actuation of a brake in the sense of overcoming a brake release gap for the purpose of bringing a brake lining closer to a brake drum;
    a slack readjustment device connected to and disposed between the brake lever and the brake shaft, and including a worm, wherein the brake shaft is adjustable relative to the brake lever around the rotation axis of the brake shaft by means of the slack readjustment device, in the sense of a maintaining of the brake release gap upon wear of the brake lining;
    a worm wheel, disposed fixed against rotation on the brake shaft, wherein the worm is engaged with the worm wheel in a kind of a coupling structure;
    a distance sensor located at an extension of the worm capturing a position of the slack readjustment device and serving for scanning a measurement distance (n) generated with the slack readjustment device for continuous and direct control of the wear of a brake lining;
    a signal generator connected to the distance sensor, wherein the signal generator generates a signal depending on the measurement distance (n) after scanning.

2. A brake actuating device with a brake adjustment device for a vehicle brake, comprising:
    a brake shaft;
    a brake lever performing together with the brake shaft a pivoting motion around a rotation axis of the brake shaft, where the pivoting motion serves for actuation of a brake in the sense of overcoming a brake release gap for the purpose of bringing a brake lining closer to a brake drum;

a slack readjustment device connected to and disposed between the brake lever and the brake shaft, and including a worm, wherein the brake shaft is adjustable relative to the brake lever around the rotation axis of the brake shaft by means of the slack readjustment device, in the sense of a maintaining of the brake release gap upon wear of the brake lining;

a worm wheel, disposed fixed against rotation on the brake shaft, wherein the worm is engaged with the worm wheel in a kind of a coupling structure;

a distance sensor capturing a position of the slack readjustment device and serving for scanning a measurement distance (n) generated with the slack readjustment device; a signal generator connected to the distance sensor, wherein the signal generator generates a signal depending on the measurement distance (n) after scanning;

a device component for generation of the measurement distance (n), wherein the device component is adjustable with the worm coordinated and associated to the slack readjustment device, wherein the device component is disposed longitudinally shiftable relative to the worm, and wherein the measurement distance (n) can be generated depending on the readjustment motion of the worm, wherein the worm is disposed in the brake lever and includes an extension, connected against rotation to the worm, wherein the extension extends outside of the brake lever;

a transfer mechanism connected to and disposed between the extension and the device component, wherein the transfer mechanism serves for transmitting an adjustment motion of the worm to the device component, wherein the slack readjustment device includes a control cam disposed inclined relative to a shifting axis of the device component, wherein the distance sensor connected to the signal generator is formed as a contact pin, and wherein the contact pin is engaged with the control cam.

3. A brake actuating device with a brake adjustment device for a vehicle brake, comprising:

a brake shaft;

a brake lever performing together with the brake shaft a pivoting motion around a rotation axis of the brake shaft, where the pivoting motion serves for actuation of a brake in the sense of overcoming a brake release gap for the purpose of bringing a brake lining closer to a brake drum;

a slack readjustment device connected to and disposed between the brake lever and the brake shaft, and including a worm, wherein the brake shaft is adjustable relative to the brake lever around the rotation axis of the brake shaft by means of the slack readjustment device, in the sense of a maintaining of the brake release gap upon wear of the brake lining;

a worm wheel, disposed fixed against rotation on the brake shaft, wherein the worm is engaged with the worm wheel in a kind of a coupling structure;

a distance sensor capturing a position of the slack readjustment device and serving for scanning a measurement distance (n) generated with the slack readjustment device; a signal generator connected to the distance sensor, wherein the signal generator generates a signal depending on the measurement distance (n) after scanning;

a device component for generation of the measurement distance (n), wherein the device component is adjustable with the worm coordinated and associated to the slack readjustment device, wherein the device component is disposed longitudinally shiftable relative to the worm, and wherein the measurement distance (n) can be generated depending on the readjustment motion of the worm, wherein the worm is disposed in the brake lever and includes an extension, connected against rotation to the worm, wherein the extension extends outside of the brake lever;

a transfer mechanism connected to and disposed between the extension and the device component, wherein the transfer mechanism serves for transmitting an adjustment motion of the worm to the device component, wherein an outer thread, coordinated to the extension, is disposed on a bush, wherein the extension is surrounded by the bush and connected, fixed against rotation, to the bush.

4. The brake actuating device according to claim 3, wherein the transfer mechanism is formed by an inner thread of the device component, and wherein the inner thread is engaged with the outer thread fixed against rotation to the extension.

5. The brake actuating device according to claim 3, further comprising a locking mechanism disposed and acting between the bush and the extension, wherein the bush and the extension can be brought by the locking mechanism into a desired locking and engagement position.

6. A brake actuating device for a vehicle brake, comprising:

a brake shaft;

a brake lever performing together with the brake shaft a pivoting motion around a rotation axis of the brake shaft, where the pivoting motion serves for actuation of a brake in the sense of overcoming a brake release gap for the purpose of bringing a brake lining closer to a brake drum;

a slack readjustment device connected to and disposed between the brake lever and the brake shaft, and including a worm, wherein the brake shaft is adjustable relative to the brake lever around the rotation axis of the brake shaft by means of the slack readjustment device, in the sense of a maintaining of the brake release gap upon wear of the brake lining;

a worm wheel, disposed fixed against rotation on the brake shaft, wherein the worm is engaged with the worm wheel in a kind of a coupling structure;

a distance sensor capturing a position of the slack readjustment device and serving for scanning a measurement distance (n) generated with the slack readjustment device; a signal generator connected to the distance sensor, wherein the signal generator generates a signal depending on the measurement distance (n) after scanning;

wherein the slack readjustment device is furnished with a magnet-field-active means, where a motion of the magnet-field-active means relative to the signal generator can be registered as the measurement distance (n) with the distance sensor formed as a magnet field sensor, wherein the magnet-field-active means are disposed at an extension of the worm.

7. The brake actuating device according to claim 6, wherein the magnet-field-active means are disposed at a device component, connected fixed against rotation to the slack readjustment device.

8. A brake actuating device with an adjustment device for a vehicle brake, comprising:
   (a) a brake lever performing together with a brake shaft a pivoting motion around a rotation axis of the brake shaft, where the pivoting motion serves for actuation of a brake in the sense of overcoming a brake release gap for the purpose of bringing a brake lining closer to a brake drum;
   (b) a slack readjustment device is furnished between the brake lever and the brake shaft, where the brake shaft is adjustable relative to the brake lever around the rotation axis of the brake shaft by means of the slack readjustment device, in the sense of a maintaining of the brake release gap upon wear of the brake lining;
   (c) a worm wheel, disposed fixed against rotation on the brake shaft, and a worm engaged with the worm wheel form the slack readjustment device in a kind of a coupling;
   (d) wherein the improvement comprises that a signal generator (27, 31) with a distance sensor (26, 30) is furnished, which serves for scanning of a measurement distance (n), generated with the slack readjustment device (5, 7), and wherein the signal generator (27, 31) generates a signal depending on the measurement distance (n) after scanning and contacting, wherein a device component (20, 33) is furnished for generation of the measurement distance (n); wherein the device component (20, 33) is adjustable with the worm (7) coordinated and associated with the slack readjustment device (5, 7); wherein the device component (20, 33) is disposed longitudinally shiftable relative to the worm (78), and wherein the measurement distance (n) can be generated depending on an adjustment motion of the worm (7), wherein
   (e) the worm (7) is disposed in the brake lever (1) and exhibits an extension (6), forming one piece with the worm (7) and connected fixedly to the worm (7), where the extension (6) extends outside of the brake lever (1);
   (f) a transfer mechanism (18, 19) is furnished between the extension (6) and the device component (20, 33), wherein the transfer mechanism (18, 19) serves for transmitting a readjustment motion of the worm (7) to the device component (20, 33).

9. The device according to claim 8, wherein the distance sensor (26) of the signal generator (27) is formed as a contact pin (26), where the contact pin (26) is engaged with a control cam (25) disposed inclined relative to a shifting axis (24) of the device component (20);
   wherein the transfer mechanism (18, 19) is formed by an inner thread (19) of the device component (20, 33) and wherein the inner thread (19) is engaged with an outer thread (18) fixed against rotation to the extension (6);
   wherein the outer thread (18) coordinated to the extension (6) is disposed on a bush (13), wherein the extension (6) is surrounded by the bush (13) and connected, fixed against rotation to the bush (13);
   wherein a locking mechanism (14) is furnished and acts between the bush (13) and the extension (6), where the bush (13) and the extension (6) can be brought by the locking mechanism (14) into an arbitrary locking and engagement position.

10. A brake actuating device with an adjustment device for a vehicle brake, comprising:
    (a) a brake lever performing together with a brake shaft a pivoting motion around a rotation axis of the brake shaft, where the pivoting motion serves for actuation of a brake in the sense of overcoming a brake release gap for the purpose of bringing a brake lining closer to a brake drum;
    (b) a slack readjustment device furnished between the brake lever and the brake shaft, where the brake shaft is adjustable relative to the brake lever around the rotation axis of the brake shaft by means of the slack readjustment device, in the sense of a maintaining of the brake release gap upon wear of the brake lining;
    (c) a worm wheel, disposed fixed against rotation on the brake shaft, and a worm engaged with the worm wheel form the slack readjustment device in a kind of a coupling;
    (d) wherein the improvement comprises that a signal generator (27, 31) with a distance sensor (26, 30) is furnished, which serves for scanning of a measurement distance (n), generated with the slack readjustment device (5, 7), and wherein the signal generator (27, 31) generates a signal depending on the measurement distance (n) after scanning and contacting,
    wherein the slack readjustment device (5, 7) is furnished with a magnet-field-active means (30), where a motion of the magnet-field-active means (30) relative to the signal generator (31) can be registered as the measurement distance (n) with a distance sensor (32) formed as a magnet field sensor (32), wherein
    the magnet-field-active means (30) are disposed at an extension (6) of the worm (7).

11. The device according to claim 10, wherein the magnet-field-active means (30) are disposed at a device component, connected fixed against rotation to the slack readjustment device (5, 7).

12. A brake actuating device with a brake adjustment device for a vehicle brake, comprising:
    a brake shaft;
    a brake lever performing together with the brake shaft a pivoting motion around a rotation axis of the brake shaft, where the pivoting motion serves for actuation of a brake in the sense of overcoming a brake release gap for the purpose of bringing a brake lining closer to a brake drum;
    a slack readjustment device connected to and disposed between the brake lever and the brake shaft, and including a worm, wherein the brake shaft is adjustable relative to the brake lever around the rotation axis of the brake shaft by means of the slack readjustment device, in the sense of a maintaining of the brake release gap upon wear of the brake lining;
    a worm wheel, disposed fixed against rotation on the brake shaft, wherein the worm is engaged with the worm wheel in a kind of a coupling structure;
    a distance sensor capturing a position of the slack readjustment device and serving for scanning a measurement distance (n) generated with the slack readjustment device; a signal generator connected to the distance sensor, wherein the signal generator generates a signal depending on the measurement distance (n) after scanning;

a device component for generation of the measurement distance (n), wherein the device component is adjustable with the worm coordinated and associated to the slack readjustment device, where in the device component is disposed longitudinally shiftable relative to the worm, and wherein the measurement distance (n) can be generated depending on the readjustment motion of the worm, wherein the worm is disposed in the brake lever and includes an extension, connected against rotation to the worm, wherein the extension extends outside of the brake lever;

a transfer mechanism connected to and disposed between the extension and the device component, wherein the transfer mechanism serves for transmitting an adjustment motion of the worm to the device component, wherein the transfer mechanism is formed by the device component, attached fixed against rotation to the extension wherein an outer thread, coordinated to the extension, is disposed on a bush, wherein the extension is surrounded by the bush and connected, fixed against rotation, to the bush.

13. The brake actuating device according to claim 12, wherein the worm is disposed in the brake lever and includes an extension, forming one piece with the worm, wherein the extension extends outside of the brake lever.

14. A brake actuating device for a vehicle brake, comprising:
   a brake shaft;
   a brake lever performing together with the brake shaft a pivoting motion around a rotation axis of the brake shaft, where the pivoting motion serves for actuation of a brake in the sense of overcoming a brake release gap for the purpose of bringing a brake lining closer to a brake drum;
   a slack readjustment device connected to and disposed between the brake lever and the brake shaft, and including a worm, wherein the brake shaft is adjustable relative to the brake lever around the rotation axis of the brake shaft by means of the slack readjustment device, in the sense of a maintaining of the brake release gap upon wear of the brake lining;
   a worm wheel, dispose fixed against rotation on the brake shaft, wherein the worm is engaged with the worm wheel in a kind of a coupling structure;
   a distance sensor capturing a position of the slack readjustment device and serving for scanning a measurement distance (n) generated with the slack readjustment device; a signal generator connected to the distance sensor, wherein the signal generator generates a signal depending on the measurement distance (n) after scanning;
   a device component for generation of the measurement distance (n), wherein the device component is adjustable with the worm coordinated and associated to the slack readjustment device, wherein the device component is disposed longitudinally shiftable relative to the worm, and wherein the measurement distance (n) can be generated depending on the readjustment motion of the worm, wherein the worm is disposed in the brake lever and includes an extension, connected against rotation to the worm, wherein the extension extends outside of the brake lever;
   a transfer mechanism connected to and disposed between the extension and the device component, wherein the transfer mechanism serves for transmitting an adjustment motion of the worm to the device component,
   wherein the slack readjustment device is furnished with a magnet-field-active means, where a motion of the magnet-field-active means relative to the signal generator can be registered as the measurement distance (n) with the distance sensor formed as a magnetic field sensor, wherein the magnet-field-active means are disposed at an extension of the worm, and wherein the magnet-field-active means are disposed at a device component, connected fixed against rotation to the slack readjustment device.

15. The brake actuating device according to claim 14, wherein the worm is disposed in the brake lever and includes an extension, forming one piece with the worm, wherein the extension extends outside of the brake lever.

16. A brake actuating device with an adjustment device for a vehicle brake, comprising:
   (a) a brake lever performing together with a brake shaft a pivoting motion around a rotation axis of the brake shaft, where the pivoting motion serves for actuation of a brake in the sense of overcoming a brake release gap for the purpose of bringing a brake lining closer to a brake drum;
   (b) a slack readjustment device furnished between the brake lever and the brake shaft, where the brake shaft is adjustable relative to the brake lever around the rotation axis of the brake shaft by means of the slack readjustment device, in the sense of a maintaining of the brake release gap upon wear of the brake lining;
   (c) a worm wheel, disposed fixed against rotation on the brake shaft, and a worm engaged with the worm wheel form the slack readjustment device in a kind of a coupling;
   (d) wherein the improvement comprises that a signal generator (27, 31) with a distance sensor (26, 30) is furnished, which serves for scanning of a measurement distance (n), generated with the slack readjustment device (5, 7), and wherein the signal generator (27, 31) generates a signal depending on the measurement distance (n) after scanning and contacting;
   (e) wherein a device component (20, 33) is furnished for generation of the measurement distance (n), wherein the device component (20, 33) is adjustable with the worm (7) coordinated and associated with the slack readjustment device (5, 7), wherein the device component (20, 33) is disposed longitudinally shiftable relative to the worm (7), and wherein the measurement distance (n) can be generated depending on an adjustment motion of the worm (7);
   (f) wherein the worm (7) is disposed in the brake lever (1) and exhibits an extension (6), connected against rotation to the worm (7), where the extension (6) extends outside of the brake lever (1);
   (g) a transfer mechanism (18, 19) is furnished between the extension (6) and the device component (20, 33), wherein the transfer mechanism (18, 19) serves for transmitting a readjustment motion of the worm (7) to the device component (20, 33), wherein the slack readjustment device (5, 7) is furnished with a magnet-field-active means (30), where a motion of the magnet-field-active means (30) relative to the signal generator (31) can be registered as the measurement distance (n) with a distance sensor (32) formed as a magnet field sensor (32), wherein the magnet-field-active means (30) are disposed at an extension (6) of the worm (7), and wherein the magnet-field-active means (30) are disposed at a device component, connected fixed against rotation to the slack readjustment device (5, 7).

17. The brake actuating device according to claim 16, wherein the worm (7) is disposed in the brake lever (1) and includes an extension (6), forming one piece with the worm (7), wherein the extension (7) extends outside of the brake lever (1).

* * * * *